US012564983B2

(12) United States Patent
Ghirelli et al.

(10) Patent No.: US 12,564,983 B2
(45) Date of Patent: Mar. 3, 2026

(54) METHOD FOR REALISING CERAMIC SLABS OR TILES

(71) Applicant: SYSTEM CERAMICS S.P.A., Fiorano Modenese (IT)

(72) Inventors: Ivan Ghirelli, Castellarano (IT); Franco Gozzi, Formigine (IT); Paolo Vaccari, Modena (IT)

(73) Assignee: SYSTEM CERAMICS S.P.A., Fiorano Modenese (IT)

( * ) Notice: Subject to any disclaimer, the term of this patent is extended or adjusted under 35 U.S.C. 154(b) by 1087 days.

(21) Appl. No.: 17/595,677

(22) PCT Filed: Jun. 5, 2020

(86) PCT No.: PCT/IB2020/055302
§ 371 (c)(1),
(2) Date: Nov. 22, 2021

(87) PCT Pub. No.: WO2020/245778
PCT Pub. Date: Dec. 10, 2020

(65) Prior Publication Data

US 2022/0219352 A1 Jul. 14, 2022

(30) Foreign Application Priority Data

Jun. 6, 2019 (IT) ........................ 102019000008238

(51) Int. Cl.
*B28B 11/00* (2006.01)
*B28B 3/12* (2006.01)
(Continued)

(52) U.S. Cl.
CPC ............ *B28B 11/001* (2013.01); *B28B 3/123* (2013.01); *B28B 11/04* (2013.01);
(Continued)

(58) Field of Classification Search
None
See application file for complete search history.

(56) References Cited

U.S. PATENT DOCUMENTS 11,167,445 B2 11/2021 Stefani
2005/0234582 A1* 10/2005 Berdan, II ............... B26D 7/27 700/125
(Continued)

FOREIGN PATENT DOCUMENTS

CN 101142153 A 3/2008
CN 108068207 A 5/2018
(Continued)

OTHER PUBLICATIONS

"Notice of Opposition" filed Oct. 24, 2024 in European equivalent application EP20736422.*
(Continued)

*Primary Examiner* — Charles Capozzi
(74) *Attorney, Agent, or Firm* — Chrisman Gallo Tochtrop LLC

(57) ABSTRACT

A method for realising ceramic slabs or tiles, comprising the following steps: laying a soft layer (SL) of granular or powder ceramic material on a support plane (P); pressing the soft layer (SL) in order to obtain a compacted layer (CL); firing the compacted layer (CL); prior to the pressing, applying an identification mark (M) onto the soft layer (SL), the identification mark (M) having an optical contrast with respect to the soft layer (SL), so as to enable an optical detection of the mark (M); subsequently to the pressing, acquiring an image of the mark (M); processing the image of the mark (M) detected so as to control one or more operating steps subsequent to the pressing.

16 Claims, 3 Drawing Sheets

(51) Int. Cl.

| | |
|---|---|
| ***B28B 11/04*** | (2006.01) |
| ***B28B 17/00*** | (2006.01) |
| ***B30B 11/00*** | (2006.01) |
| ***B30B 15/26*** | (2006.01) |

(52) U.S. Cl.
CPC ........ *B28B 17/0081* (2013.01); *B30B 11/006* (2013.01); *B30B 15/26* (2013.01)

(56) References Cited

U.S. PATENT DOCUMENTS

| | | | | |
|---|---|---|---|---|
| 2010/0052224 | A1 | 3/2010 | Toncelli | |
| 2010/0052225 | A1 | 3/2010 | Toncelli | |
| 2018/0178407 | A1 | 6/2018 | Bosi | |
| 2018/0250846 | A1 | 9/2018 | Stefani | |
| 2019/0009430 | A1 | 1/2019 | Scardovi et al. | |
| 2021/0276221 | A1* | 9/2021 | Bosi ......................... | B41J 3/407 |

FOREIGN PATENT DOCUMENTS

| | | | |
|---|---|---|---|
| CN | 109203184 | A | 1/2019 |
| EP | 1977872 | A2 | 10/2008 |
| EP | 3424661 | A1 | 1/2019 |
| IT | RE20080087 | A1 | 3/2010 |
| IT | 102017000026199 | A | 9/2018 |
| IT | 102018000010925 | | 12/2018 |
| IT | 102018000006678 | A | 12/2019 |
| JP | H01174407 | A | 7/1989 |
| RU | 86965 | U1 | 9/2009 |
| WO | 2006/099894 | A1 | 9/2006 |
| WO | 2017051275 | A1 | 3/2017 |
| WO | 2020/003163 | A1 | 1/2020 |
| WO | 2020121098 | A1 | 6/2020 |

OTHER PUBLICATIONS

English translation of ITRE20080087A1.*

"First search" (cited references) in counterpart foreign application CN 2020800414814 mailed Apr. 24, 2023.*

Amodio, D., et al., "Finite strain analysis by image processing: smoothing techniques", Strain, Nov. 1995, pp. 151-157.

Sutton, M.A., et al., "Full-field Representation of Discretely Sampled Surface Deformation for Displacement and Strain Analysis", Experimental Mechanics, Jun. 1991, pp. 168-177.

* cited by examiner

METHOD FOR REALISING CERAMIC SLABS OR TILES

The present invention relates to a method for realising ceramic tiles or slabs.

The Applicant has recently set up a process for realising ceramic slabs provided with a thickness decoration, comprising veining and other motifs which extend from the in-view surface, i.e. the surface that is in view following laying, through the thickness of the slab. This veining or decorations through the thickness of the tile reproduce, for example, veining or colours of the natural stones or the wood, and are structured in such a way as to be visible on the flanks of the slabs. In this way, if the slab is used to clad a raised plane from the floor, so that one or more flanks remain visible, such as for example a cooking hob, a bath countertop, steps or thresholds, the veining or decorations are also visible on the flanks of the slab. The veining or decorations through the thickness of the layer are realised prior to the pressing.

As well as the thickness decoration, the slabs are subjected to a decoration step of the in-view surface, realised by means of ink-jet printing or another process. The surface decoration of the slab must therefore be coherent, i.e. it must match the motif of the thickness decoration which extends through the thickness of the layer of ceramic material that is already formed. Subsequently to the surface decoration, the slabs or tiles are subjected to a firing process.

The step of surface decoration takes place after the pressing step. As the pressing step requires the application of very high pressures, so as to produce a significant compacting of the layer of ceramic material, the veining or decorations through the thickness of the layer of ceramic material can undergo consequent deformations with respect to an initial configuration prior to the pressing. It can therefore occur that the graphic design of the surface decoration, intended for application after the pressing, no longer corresponds precisely to the thickness decoration of the layer, but that there are misalignments between the surface decoration and the thickness decoration.

An object of the present invention is to provide a method for producing ceramic slabs or tiles which enables obviating the limits of the current production processes.

An advantage of the method according to the present invention is to be able to identify each slab present on the production line and to be able to identify the correct graphic surface decoration to be printed on the corresponding thickness decoration.

Another advantage of the method according to the present invention is to be able to detect the graphic deformations undergone during the pressing step by the thickness decoration and consequently to be able to correct and modify the surface decoration in such a way that it meets (coincides) and can be printed perfectly superposed on the corresponding thickness decoration.

A further advantage according to the present invention is to be able to retroactively intervene on the thickness decoration, by modifying the decoration so as to compensate for the deformations introduced by the press.

Further characteristics and advantages of the present invention will become more apparent in the following detailed description of an embodiment of the present invention, illustrated by way of non-limiting example in the attached figures, wherein.

Figure 1:
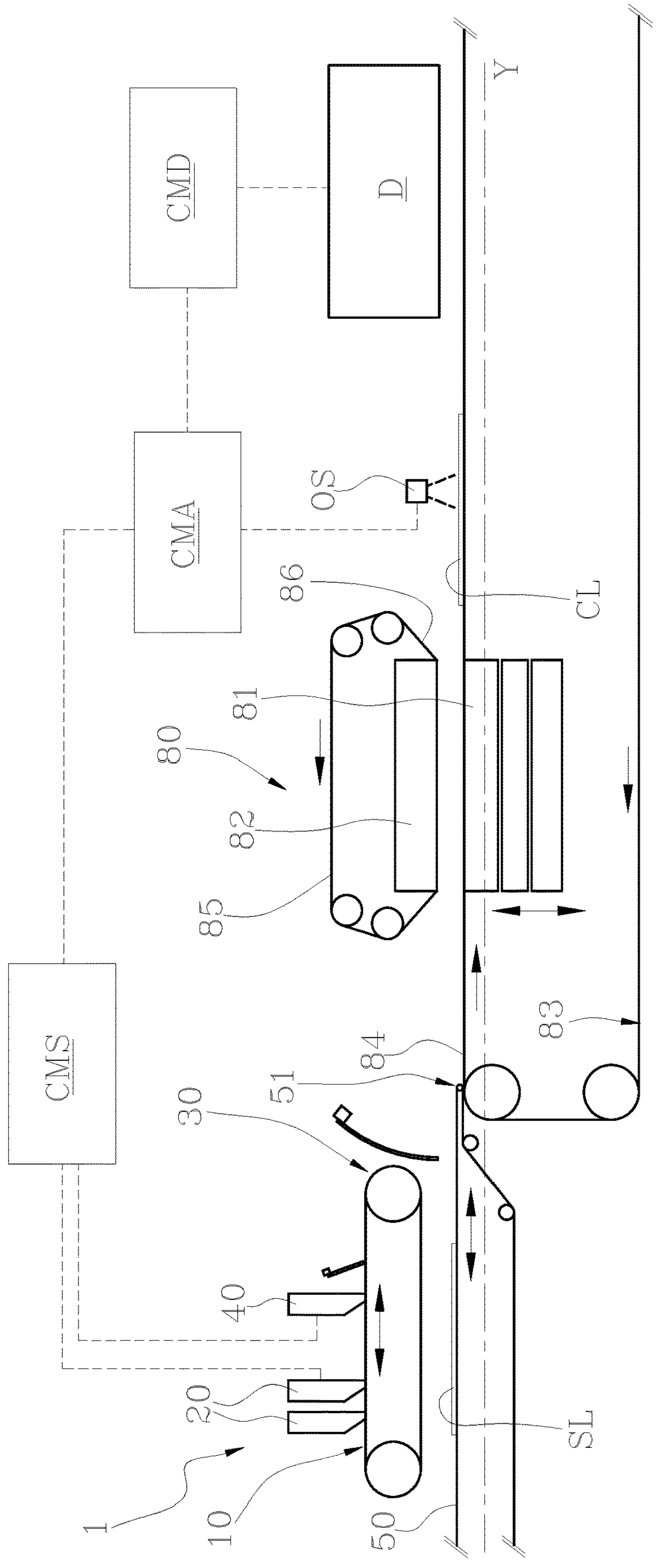
FIG. 1 shows a schematic view of a system that can be used for the actuation of the method according to the present invention.

The method for realising ceramic slabs or tiles according to the present invention includes laying a soft layer (SL) of granular or powder ceramic material on a laying plane (50). The laying of the soft layer (SL) takes place, for example, using the machine for dry decoration (10, 20, 30, 40) described in patent application 102018000010925, the content of which is taken to be incorporated herein, hereinafter referred-to as "dry decorating machine (1)". The soft layer (SL) will be subjected to a subsequent pressing step to obtain a compacted layer (CL), which is subjected to further known cutting, drying, decoration and firing steps.

In a possible embodiment of the method, the laying plane (50) is a movable plane that, as well as enabling the laying, is also predisposed to convey the soft layer (SL) to a pressing device (80).

For example, the pressing device (80) is in the form of a belt press, known in the sector for the pressing of large-format slabs. A press of this type comprises a bottom punch (81), provided with a pressing surface facing upwards. A top punch (82), provided with a pressing surface facing downwards, is located above the bottom punch. At least one of the two punches is movable nearingly and distancingly to and from the other in order to carry out a pressing of the soft layer (SL). The press further comprises a movable plane (83), in the form of a flexible belt, which has an active portion (84) arranged at least partially between the top punch (82) and the bottom punch (81). The press further comprises a second movable plane (85), in the form of a flexible belt, which has an active portion (86) arranged between the active portion (84) of the first movable plane (83) and the top punch (82).

In a preferred though not exclusive embodiment of the method, the soft layer (SL) is transferred from the laying plane (50) to the movable plane (83) of the press according to the solution described in publication WO2017051275. According to this solution, the laying plane (50), in the portion on which the soft layer (SL) is laid, is substantially aligned and contiguous, at a higher level, with respect to the active portion (84) or the forwards portion of the movable plane (83), along a longitudinal advancement direction (Y), with a front end (51) of the laying plane (50) at least partly overlying a rear end (83*a*) of the movable plane (83). In an alternative solution, the laying plane (50) extends between the punches (81, 82), i.e. the movable plane (83) is not present and the pressing of the soft layer (SL) is carried out directly on the laying plane (50).

The soft layer (SL) is preferably provided with a thickness decoration (V), which comprises veining and/or other decorative motifs which extend from the upper surface (F) of the slab, i.e. the surface destined to remain in view following laying, through the thickness of the soft layer (SL).

The dry decorating machine disclosed in the above-mentioned application enables precise control of the pattern and structure of the thickness decoration, which is realised during the laying of the soft layer (SL). This enables defining the thickness decoration in the form of a graphic file which, via a first control module (CMS), is translated into a commands cycle to the dry decorating machine which realises the thickness decoration. The same file that defines the thickness decoration also defines a surface decoration intended to be applied to the soft layer (SL) after a pressing step. In substance, the overall decoration of the slab, which comprises both the thickness decoration and the surface decoration, derives from a single graphic file that is processed to obtain a first graphic file, which defines the thickness decoration, and a second graphic file, which defines the surface decoration. The first graphic file is sent to the first control module (CMC). The second graphic file is sent to a second control module (CMC). The second control module (CMD) controls the device for realising the surface decoration, for example an ink-jet printer. In the same way as for the dry decorating machine, the control module translates the surface decoration file into a commands cycle to the device for realising the surface decoration.

The two graphic files obtained by the single graphic file comprising the overall decoration of the slab, i.e. the thickness decoration and the surface decoration, are realised for example using software programs known in the sector of graphic processing.

In a known way in the sector, the control modules (CMS), (CMD) described in the foregoing, and a third control module (CMA) which will be described in the following and cited, together with the others, in the following claims, are generically indicated as single units, but can be in fact provided with distinct functional modules (memory modules or operating modules), each set up to control a determined device or cycle of operations. In substance, the control module can be constituted by a single electronic device, programmed to carry out the functions described, and the various functional modules can correspond to hardware and/or routine software programs which are part of the programmed device. Alternatively or additionally, these functions can be performed by a plurality of electronic devices on which the aforesaid functional modules can be distributed. The units can further rely on one or more processors for the execution of the instructions contained in the memory modules. The units and the aforesaid functional modules can further be distributed over different local or remote computers on the basis of the architecture of the network they reside in. The control modules (CMS), (CMD) and (CMA) can be integrated in a general control module of the production line.

Prior to the pressing, the method according to the present invention includes applying an identification mark (M) onto the soft layer (SL), the identification mark (M) having an optical contrast with respect to the soft layer (SL), so as to enable an optical detection of the mark (M). As will more fully emerge in the following, the mark (M) can be structured in various different shapes. For example, the mark (M) can be detected by means of the non-optical type, such as magnetic, ultrasonic or other means.

The mark (M) is applied during the laying of the soft layer (SL), or subsequently to the laying of the soft layer (SL).

The mark (M) can be made of a granular or powder material, or in liquid material. In the first case, the mark (M) can be included in the thickness decoration (V) and be applied during the laying of the soft layer (SL), by means of the same dry decorating machine that lays the soft layer (SL). Alternatively, the mark (M) can be applied with a special device that is different to the dry decorating machine. In the second case, the mark (M) can be applied by means of a dispenser nozzle for liquids or another equivalent device.

In any case, the mark (M) is provided with a colour and/or a tone and/or a configuration that is such as to be detectable optically on the soft layer (SL).

As already mentioned, the mark (M) can take on various conformations. For example it can be single, or can comprise two or more marks separate from one another and located in different positions on the soft layer (SL).

Figure 2:
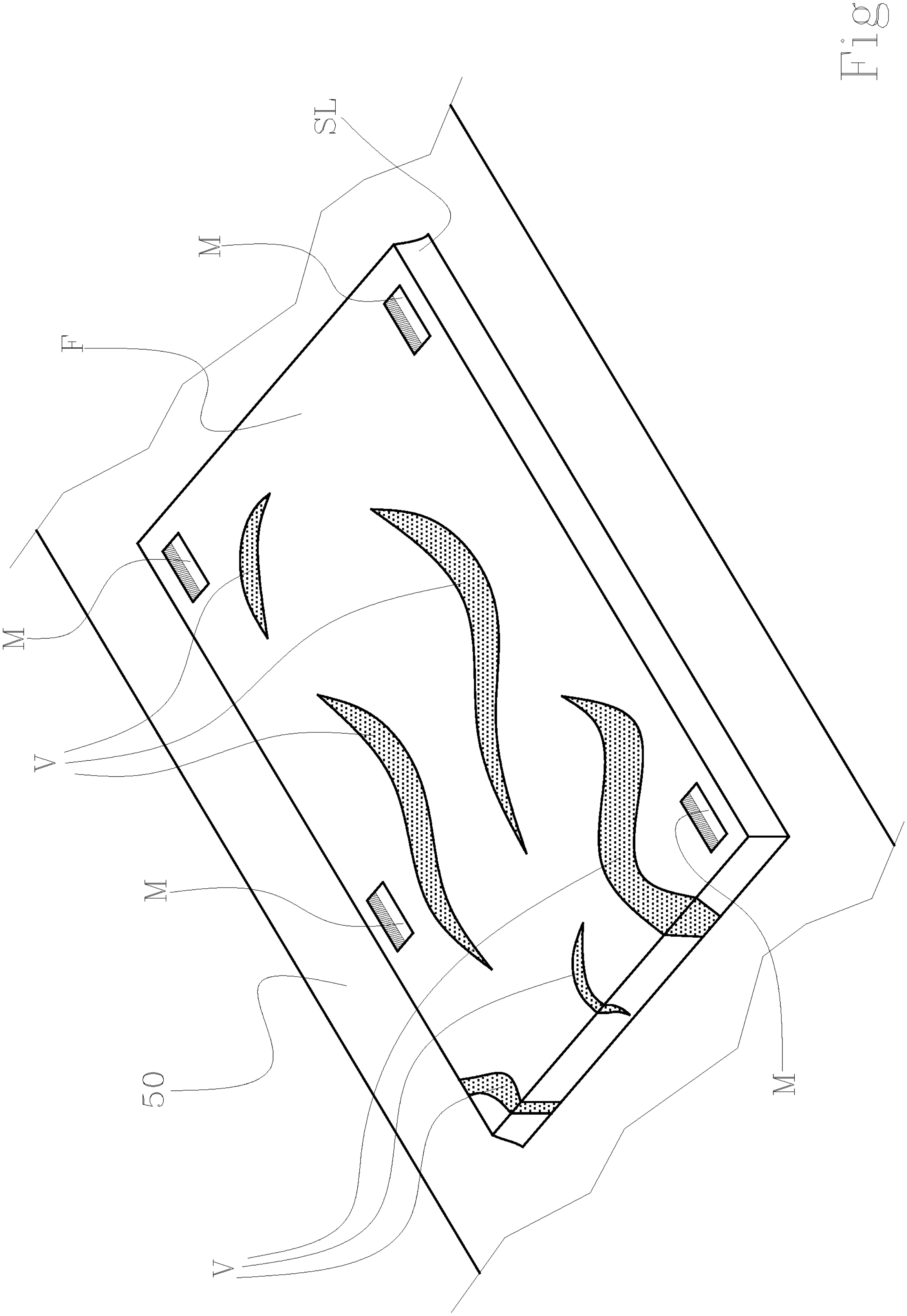
FIG. 2 shows a schematic view of an intermediate product obtained during the carrying out of the method according to the present invention.
Figure 3:
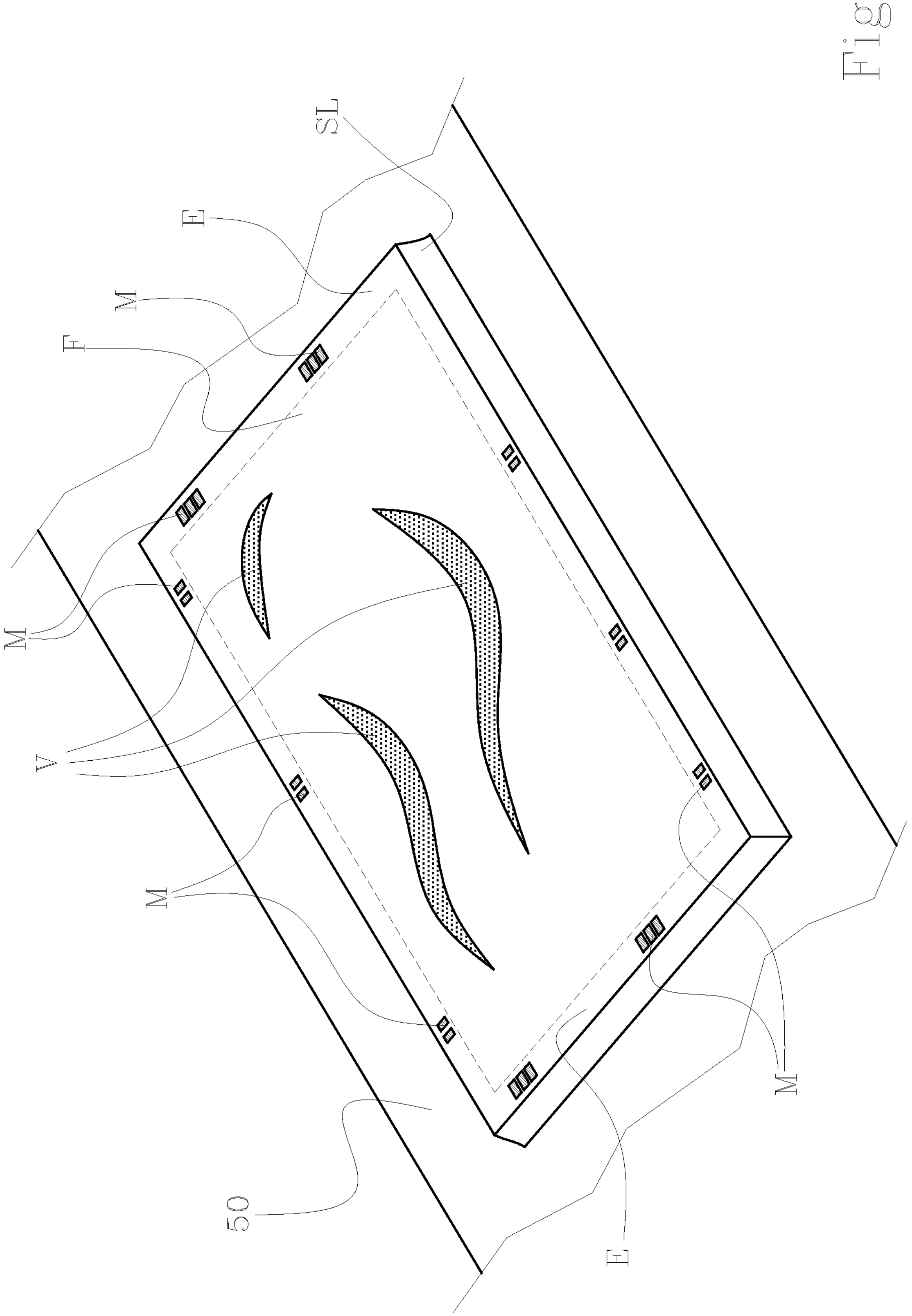
FIG. 3 shows a schematic view of another intermediate product obtained during the carrying out of the method according to the present invention.

In a possible embodiment, not exclusive, the mark (M) comprises two very highly contrasting zones, fully separate from one another, for example a very dark zone flanked by a very light zone. In the embodiment illustrated in FIG. 2, the mark (M) has an overall quadrangular shape and is subdivided into two portions, separated by a line. One portion is very dark, while the other portion is very light. In this way, notwithstanding the colour or tone of the surface of the soft layer (SL), the demarcation line between the two portions of the mark (M) is clearly visible and optically detectable. It would however be possible to use different shapes for the mark (M), for example crossed geometric shapes, with lines or notches, or others. Further, an embodiment is possible in which the mark (M) is defined by a surface zone of the thickness decoration (V).

In another possible embodiment, the mark (M), however shaped, is positioned on an edge zone (E) of the soft layer (SL). The edge zone, after the pressing, is destined to be removed from the compacted layer (CL). For example, the edge zone (E) can be laid together with the soft layer (SL), defining an extension thereof. The edge zone (E) might be realised using the same material as the soft layer (SL), or using a different material.

In any case, the mark (M) is provided with a colour and/or a tone and/or a configuration that is such as to be detectable optically on the edge zone (SL). In this embodiment the mark (M) preferably comprises a plurality of notches distributed in a prefixed manner in the edge zone (E). The edge zone (E) might be located along one or more sides of the soft layer (SL), or it might be in the form of a frame surrounding the soft layer (SL). As already stressed, the edge zone (E) defines an extension of the soft layer (SL), i.e. it is joined to the soft layer (SL) in a continuous way. In other terms, there are no interruptions between the soft layer (SL), i.e. the soft layer (SL), and the edge zone (E) define a single layer. The edge zone (E) is subjected to pressing together with the soft layer (SL).

The mark (M) can advantageously be structured to carry information that can be used to control one or more operating steps of the production process. For example, the mark (M) can be structured to identify a geometric reference on the compacted layer (CL) after the pressing. Further, the mark (M) can be structured as a code to be able to identify a predetermined decoration assigned to a slab. In particular, the mark (M) can be structured as a code to identify a predetermined decoration file, comprising both the thickness decoration and the surface decoration. The mark (M) can combine both the above-summarised information, together with any further information.

The method includes acquiring an image of the mark (M) or of a zone containing the method (M), after the pressing, and processing the image of the mark (M) so as to control one or more operating steps preceding or subsequent to the pressing of the soft layer (SL). The processing of the image of the mark (M) is carried out by a third control module (CMA).

The processing of the image of the mark (M) comprises detecting the position of at least a part of the mark (M) in the image acquired. This position is substantially a final position of the mark (M), i.e. a position that the mark (M) assumes after the pressing.

The processing of the image of the mark (M) further provides a comparison between the above-described final position and an initial position, i.e. prior to the pressing, of the mark (M) or the same part of the mark (M).

In a preferred embodiment of the method, the initial position of the mark (M) is a theoretical or ideal position, i.e. it is assumed that the mark (M), before the pressing, is located at a predetermined position with respect to the thickness decoration (V). The final position of the mark (M) is then compared to the theoretical or ideal initial position of the mark (M). In a possible embodiment of the method, the initial position of the mark (M) is instead detected and defined in real terms on the soft layer (SL), for example by means of an optical acquisition. Alternatively, the detection of the position of the mark (M) can be carried out with magnetic means and/or ultrasonic means.

In other words, the control of one or more steps preceding and/or subsequent to the pressing is carried out on the basis of a comparison between the initial position and the final position of the mark (M). In this case, the acquisition of an image of the mark (M) basically consists in detecting the final position of the mark (M), i.e. the position of the mark (M) subsequent to the pressing. In this case, the method according to the present invention comprises the following steps:

- laying a soft layer (SL) of granular or powder ceramic material on a support plane (P);
- pressing the soft layer (SL) in order to obtain a compacted layer (CL); firing the compacted layer (CL);
- prior to the pressing, applying an identification mark (M) onto the soft layer (SL) in an initial position;
- subsequently to the pressing, detecting a final position of the mark (M);
- carrying out a comparison between the initial position and the final position of the mark (M);
- controlling one or more operating steps preceding and/or subsequent to pressing the soft layer (SL) as a function of the comparison between the initial position and the final position of the mark (M).

Preferably, the final position of the mark (M) is detected by acquiring an image of the mark (M), or of a zone containing the mark (M).

Preferably, the initial position of the mark (M) is detected by acquiring an image of the mark (M), or of a zone containing the mark (M).

If predisposed as a geometric reference, the mark (M) provides an indication of the deformation that the soft layer (SL) has undergone after the pressing. Knowing the position of the mark (M) before the pressing, in ideal or real terms, it is possible to carry out a comparison between the initial position of the mark (M) and the final position of the mark (M), acquired optically or in another way after the pressing. The comparison enables defining a displacement vector, in terms of length and direction, of a displacement of the mark (M) with respect to the initial position or ideal position of the mark (M). The comparison between the initial and final positions can be limited to a part or zone of the mark (M), or the whole mark (M), in relation to the shape of the mark (M) itself.

The greater the number of marks (M) used, the greater the precision with which the deformation undergone by the thickness decoration (V) during the pressing will be defined.

For example, using three marks (M) distributed at the vertices of a triangle, i.e. not aligned along the same straight line, three displacement vectors can be defined, between each one of them and the respective theoretical or ideal mark. From the processing of the three vectors it is possible to define an overall or scale translation, rotation and deformation, i.e. to precisely determine the deformation undergone by the soft layer (SL) after the pressing, using processing techniques known to a person skilled in the art. In other words, if the mark (M) comprises two or more marks (M) separate from one another and located in different positions on the soft layer (SL), the comparison between the initial position and the final position is carried out for each of the separate marks. In this case, the method can also include a comparison between the relative initial position and the relative final position between the separate marks that define the mark (M).

In this case, the method according to the present invention comprises the following steps:

- subsequently to the pressing, detecting the final position of each mark (M);
- carrying out a comparison between the initial position and the final position of each mark (M);
- controlling one or more operating steps preceding and/or subsequent to pressing the soft layer (SL) as a function of the comparison between the initial position and the final position of each mark (M).

Also in this case, preferably, the final position of each mark (M) is detected through the acquisition of an image of the mark (M) itself.

Preferably, the initial position of the mark (M) is also detected through the acquisition of an image of the mark (M), or of a zone containing the mark (M).

Using a greater number of marks (M), substantially in the above-described ways, it is possible to define one or more transformation matrices which, defining the displacement of each mark (M), precisely and efficiently determine the deformation undergone by the decoration in its entirety.

The detection and quantification of the potential displacements of the mark (M), and the definition of the displacement vector or of the transformation matrix, are carried out using devices and algorithms of the known type. The datum relative to the displacement of each mark (M) is processed by the third control module (CMA) in order to control one or more successive steps of the production process.

In a possible embodiment of the method, the datum relative to the displacement of each mark (M), i.e. the displacement vector, is processed with the aim of orientating and/or modifying the surface decoration to be applied on the surface (F) of the compacted layer (CL). In fact, the displacement of the mark (M) is also indicative of a displacement and/or a deformation of the thickness decoration. The third control module (CMA) processes the datum relative to the displacement of the mark (M) to obtain information, for example a commands and/or checks cycle, to be communicated to the second control module (CMD) connected to the decorating device (D), for the application of the surface decoration, with the purpose of carrying out one or more of the following operations on the surface decoration:

- modification of the orientation about a perpendicular axis to the surface (F) of the compacted layer (CL), i.e. about a vertical axis;
- displacement on the plane of the surface (F) of the compacted layer (CL), i.e. on a horizontal plane;
- modification and/or deformation of the structure of the surface decoration, for example a lengthening or shortening of the surface decoration along one or more horizontal directions.

In substance, the second control module (CMD) modifies the surface decoration file on the basis of the displacement vector detected, i.e. on the basis of the displacement of each mark (M), so as to adapt the surface decoration to the modifications of the thickness decoration that took place during the pressing step. The surface decoration file modified by the second control module (CMD) is then sent to the decorating device (D), or used for the control thereof, for the purpose of applying the modified surface decoration. The operations carried out on the surface decoration enable compensating for the displacement and/or the deformation undergone by the thickness decoration during the pressing step, so as to guarantee perfect correspondence between the thickness decoration and the surface decoration.

As already highlighted, to facilitate and make more precise the detection and quantification of displacements due to the pressing, the mark (M) can be made in the form of two or more marks located in predetermined positions on the soft layer (SL) and/or on the edge zone (E). For example, the mark (M) comprises four marks or notches positioned in proximity of the four vertices of the soft layer (SL). The acquisition of the two or more marks can be processed with the purpose of detecting and quantifying the relative displacements between them and/or the displacements of each of them with respect to a known initial position, so as to define corresponding displacement vectors. In other words, in the case in which the mark (M) comprises two or more marks separate from one another and located in different positions on the soft layer (SL), the comparison between the initial position and the final position is carried out for each of the separate marks. In this case, the method can also include a comparison between the relative initial position and the relative final position between the separate marks that define the mark (M).

In any case, the information relative to the displacements of the marks (M) is processed in a commands cycle for the decorating device (D) that enable modifying and adapting the surface decoration to the deformations undergone by the soft layer (SL) and by the thickness decoration after the pressing. Further, the relative displacement between two marks can be usefully processed in order to quantify a stretching or a shortening of the soft layer (SL) along a direction passing through the two marks. This stretching or shortening is processed to define a corresponding stretching or shortening of the surface decoration which is translated into a corresponding commands cycle for the decorating device (D) for the application of the surface decoration.

In exactly the same way to the modification of the surface decoration, each displacement vector is processed to orientate a cutting or trimming device for cutting or trimming the edges of the compacted layer (CL). In fact, it can occur that after the pressing, the thickness decoration might be subjected to a displacement and/or a rotation on the surface (F) of the soft layer (SL). The information detected on the displacements of the mark (M) can be processed and translated into a commands cycle for the cutting or trimming device for cutting or trimming the edges, which is activated in such a way as to carry out the cutting or trimming of the edges in a prefixed position with respect to the actual position of the thickness decoration and/or the surface decoration which, in turn, is aligned to the thickness decoration in the above-described ways.

In a further possible embodiment of the method, each displacement vector is processed with the purpose of retroactively intervening on the thickness decoration, so as to modify the thickness decoration in order to compensate for the deformations introduced by the pressing. In this embodiment of the method, the third control module (CMA), after having detected and quantified the displacements of the mark (M), processes the information with the aim of obtaining a commands cycle for the dry decorating machine (1) which modify the thickness decoration in such a way as to compensate for the deformations introduced by the pressing. In other terms, starting from a provided initial configuration of the thickness decoration, the control module (CMS) previously modifies the thickness decoration, i.e. before the application to the soft layer (SL), so that, with the deformations introduced by the pressing, the thickness decoration returns to the provided initial configuration. In this embodiment of the method it is not necessary to modify the surface decoration, or, in any case, the modifications required to the surface decoration are very limited. Obviously the described solutions can be combined so as to modify both the thickness decoration and the surface decoration, operating on both the dry decorating machine (1) and on the surface decorating device (D). Preferably, the transformation matrix is processed to modify the shape and/or the dimensions of the decoration to be applied to the soft layer (SL).

The detection and quantification of the displacements of the mark (M) are carried out in reference to a known initial position of the mark (M). This initial position is defined with precision by the device for depositing the soft layer (SL) or by the device predisposed to apply, to the soft layer (SL), the mark (M) in granular or liquid form. Alternatively, the initial position of the mark (M) is detected optically or in another way before the pressing step. In both solutions, the following processing of the image of the mark (M) detected after the pressing are the same as described in the foregoing.

The acquisition of the image of the mark (M) can be carried out by means of one or more optical sensors (OS) of known type in the sector. Each optical sensor (OS) is connected to the third control module (CMA), to transmit thereto a detected image of the mark (M). One or more optical sensors are preferably positioned downstream of the pressing device (80) upstream of the decorating device (D).

In an embodiment of the method, the image or images of the mark (M) acquired after the pressing are processed in order to choose, from an archive containing a plurality of graphic decorations, a surface decoration to be applied on the surface of the compacted layer (CL). In other terms, the mark (M) is structured as a code to identify a file relative to an overall decoration applied to the slab. For example, the mark (M) is structured as a sequence of notches which represent a binary coding in which the presence of a notch corresponds to the symbol 1, while a space without a notch corresponds to the symbol 0. As already stressed in the foregoing, the file that defines the overall decoration comprises both the thickness decoration, and the surface decoration. The thickness decoration is applied prior to the pressing, while the surface decoration is applied after the pressing. When processing the image of the mark (M) detected after the pressing, the third control module (CMA) communicates to the second control module (CMD), connected to the decorating device (D) for the surface decoration, the indication of the file containing the surface decoration which corresponds to the thickness decoration already applied to the soft layer (SL). For this purpose, the image of the mark (M) can be acquired after a selection step, subsequent to the pressing, in which any compacted layers (CL) that have undergone damage during the pressing are discarded. This enables exclusion of any risk of error in the application of the surface decoration.

Preferably, though not necessarily, the mark or marks (M) are applied in proximity of the edge of the soft layer (SL), i.e. inside the edge zone (E). This enables removing the mark or marks (M) before or after firing the slab, by removing the edge zone (E) of the compacted layer (CL) or the fired slab.

The invention claimed is:

1. A method for realising ceramic slabs or tiles, comprising the following steps:

laying a soft layer (SL) of granular or powder ceramic material on a support plane (P), the laying of the soft layer (SL) comprises a step of laying an edge zone (E) of the soft layer;

pressing the soft layer (SL) in order to obtain a compacted layer (CL);

firing the compacted layer (CL);

wherein, prior to the pressing, applying an identification mark (M) only onto the edge zone (E) of the soft layer (SL), the identification mark (M) having an optical contrast with respect to the soft layer (SL), so as to enable an optical detection of the mark (M);

subsequently to the pressing, acquiring an image of the mark (M) and removing the edge zone (E) and the entire identification mark (M) from the compacted layer (CL);

processing the image of the mark (M) detected so as to control one or more operating steps preceding and/or subsequent to the pressing of the soft layer (SL).

2. The method according to claim 1, wherein:

the step of acquiring an image of the mark (M) comprises acquiring an image of the edge zone (E) containing the mark (M);

the step of processing the image of the mark (M) comprises detecting a position of the mark (M) in the image acquired subsequently to the pressing, i.e., a final position of the mark (M);

carrying out a comparison between the final position of the mark (M) and an initial position of the mark (M) preceding the pressing;

detecting a displacement vector comprising a length and direction datum of a displacement of the mark (M) from the initial position to the final position.

3. The method according to claim 1, wherein the mark (M) comprises two or more marks (M).

4. The method according to claim 3, wherein:

the step of acquiring an image of the mark (M) comprises, for each mark (M), acquiring the image of the edge zone (E) containing the mark (M);

the step of processing the image of the mark (M) comprises, for each mark (M), detecting a position of the mark (M) in the image acquired subsequently to the pressing, i.e., a final position of the mark (M);

for each mark (M), carrying out a comparison between the final position of the mark (M) and an initial position of the mark (M) preceding the pressing;

detecting a transformation matrix comprising the displacement data of each mark (M) from the initial position to the final position.

5. The method according to claim 1, comprising the following steps:

providing an overall decoration comprising a thickness decoration (V), intended to extend from an upper surface (F) of a slab through the thickness of the soft layer (SL), and a surface decoration, intended to be applied to the upper surface (F) of a slab after the pressing;

applying the thickness decoration (V) to the soft layer (SL) prior to the pressing;

applying the surface decoration to the compacted layer (CL) after the pressing.

6. The method according to claim 2, comprising the following steps:

providing an overall decoration comprising a thickness decoration (V), intended to extend from an upper surface (F) of a slab through the thickness of the soft layer (SL), and a surface decoration, intended to be applied to the upper surface (F) of a slab after the pressing;

applying the thickness decoration (V) to the soft layer (SL) prior to the pressing;

applying the surface decoration to the compacted layer (CL) after the pressing;

wherein the displacement vector is processed in order to modify the surface decoration to be applied to the compacted layer (CL).

7. The method according to claim 4, comprising the following steps:

providing an overall decoration comprising a thickness decoration (V), intended to extend from an upper surface (F) of a slab through the thickness of the soft layer (SL), and a surface decoration, intended to be applied to the upper surface (F) of a slab after the pressing;

applying the thickness decoration (V) to the soft layer (SL) prior to the pressing;

applying the surface decoration to the compacted layer (CL) after the pressing;

wherein the transformation matrix is processed in order to orientate the surface decoration to be applied to the compacted layer (CL).

8. The method according to claim 4, comprising the following steps:

providing an overall decoration comprising a thickness decoration (V), intended to extend from an upper surface (F) of a slab through the thickness of the soft layer (SL), and a surface decoration, intended to be applied to the upper surface (F) of a slab after the pressing;

applying the thickness decoration (V) to the soft layer (SL) prior to the pressing;

applying the surface decoration to the compacted layer (CL) after the pressing;

wherein the transformation matrix is processed in order to modify the shape and/or the dimensions of the surface decoration to be applied to the compacted layer (CL).

9. The method according to claim 4, comprising the following steps:

providing an overall decoration comprising a thickness decoration (V), intended to extend from an upper surface (F) of a slab through the thickness of the soft layer (SL), and a surface decoration, intended to be applied to the upper surface (F) of a slab after the pressing;

applying the thickness decoration (V) to the soft layer (SL) prior to the pressing;

applying the surface decoration to the compacted layer (CL) after the pressing;

wherein the transformation matrix is processed in order to modify the shape and/or the dimensions of the thickness decoration to be applied to the soft layer (SL).

10. The method according to claim 4, comprising the following steps:

providing an overall decoration comprising a thickness decoration (V), intended to extend from an upper surface (F) of a slab through the thickness of the soft layer (SL), and a surface decoration, intended to be applied to the upper surface (F) of a slab after the pressing;

applying the thickness decoration (V) to the soft layer (SL) prior to the pressing;

applying the surface decoration to the compacted layer (CL) after the pressing;

wherein the transformation matrix is processed in order to orientate a cutting or trimming device for cutting or trimming the edges of the compacted layer (CL).

11. The method according to claim 1, wherein the acquired image of the mark (M) is processed in order to choose, from an archive containing a plurality of graphic decorations, a surface decoration to be applied on the surface of the compacted layer (CL).

12. The method according to claim 1, wherein the edge zone (E) and the mark (M) are laid during the laying of the soft layer (SL).

13. The method according to claim 1, wherein the mark (M) is applied during the laying of the soft layer (SL) or subsequently to the laying of the soft layer (SL).

14. The method according to claim 1, wherein the mark (M) is made of powder or ceramic material.

15. The method according to claim 1, wherein the mark (M) is made of liquid material.

16. The method according to claim 1, wherein removing the edge zone (E) and the entire identification mark (M) from the compacted layer (CL) results in the compacted layer (CL) being pressed and fired without the identification mark (M).

* * * * *